United States Patent
Föhl

[11] Patent Number: 6,024,383
[45] Date of Patent: Feb. 15, 2000

[54] ENERGY CONVERTER IN A RESTRAINING SYSTEM FOR VEHICLE OCCUPANTS

[75] Inventor: Artur Föhl, Schorndorf, Germany

[73] Assignee: TRW Occupant Restraint Systems GmbH, Alfdorf, Germany

[21] Appl. No.: 08/385,741

[22] Filed: Feb. 8, 1995

Related U.S. Application Data

[63] Continuation of application No. 08/019,770, Feb. 19, 1993, abandoned.

[30] Foreign Application Priority Data

Feb. 27, 1992 [DE] Germany .............................. 42 06 117

[51] Int. Cl.[7] .................................................. B60R 22/46
[52] U.S. Cl. .............................. 280/806; 60/632; 60/638; 188/371; 297/480
[58] Field of Search ..................... 280/806, 801.1; 297/480; 188/371, 374, 377; 60/632, 635, 638

[56] References Cited

U.S. PATENT DOCUMENTS

| | | | |
|---|---|---|---|
| 3,583,530 | 6/1971 | Devenne | 280/805 |
| 4,223,763 | 9/1980 | Duclos et al. | 74/492 |
| 4,258,934 | 3/1981 | Tsuge et al. | 297/480 |
| 4,288,098 | 9/1981 | Tsuge et al. | 280/806 |
| 4,360,171 | 11/1982 | Reid et al. | 280/806 |
| 4,422,669 | 12/1983 | Chilba et al. | |
| 4,423,846 | 1/1984 | Fohl | 280/806 |
| 4,441,738 | 4/1984 | Tsuge et al. | |
| 5,069,482 | 12/1991 | Fohl | |
| 5,104,193 | 4/1992 | Fohl | 297/480 |

FOREIGN PATENT DOCUMENTS

| | | |
|---|---|---|
| 0422410 | 9/1990 | European Pat. Off. |
| 2219867 | 9/1974 | France . |
| 2494997 | 6/1982 | France . |
| 2349891 | 4/1975 | Germany . |
| 2811694 | 9/1979 | Germany ............................ 280/806 |

*Primary Examiner*—Eric Culbreth
*Attorney, Agent, or Firm*—Tarolli, Sundheim, Covell, Tummino & Szabo LLP

[57] ABSTRACT

In an energy converter in a restraining system for vehicle occupants a particularly smooth profile of the force as a function of the travel is achieved in that a plastic deformation of a tubular converter body (10) is effected which has a circular cross-sectional form in the undeformed state. Two symmetrically oppositely disposed rollers (18) are provided which each bear on a ramp face of a piston element (14).

9 Claims, 2 Drawing Sheets

ENERGY CONVERTER IN A RESTRAINING SYSTEM FOR VEHICLE OCCUPANTS

This is a continuation of application Ser. No. 08/019,770, filed on Feb. 19, 1993, now abandoned.

BACKGROUND OF THE INVENTION

The present invention relates to an energy converter in a restraining system for vehicle occupants, comprising a tubular converter body of plastically deformable material and a pair of rollers which on two symmetrically opposite sides are arranged with their axes perpendicular to the axis of the tubular converter body.

The purpose of such an energy transformer or converter is to diminish load peaks in a safety belt system which occur during the forward displacement of a vehicle occupant in a vehicle collision. The use of such an energy converter is particularly effective in combination with a belt pretensioner which eliminates the belt slack before the forward displacement of the vehicle occupant begins. An adequate movement travel is then available for the forward displacement of the vehicle occupant and the simultaneously occurring energy transformation.

Such an energy converter, which is also referred to as a force limiter, is described in EP 0 422 410 A1. It consists of a cylinder of plastically deformable material in which a rod is received which projects at its one end out of the cylinder and its other end defines a free space in which a plurality of roller bodies are accommodated. The outer diameter of, the ring arrangement formed by the roller bodies is greater that the inner diameter of the cylinder bore. Under a high tensile load between the cylinder and the rod the roller bodies penetrate into the material of the cylinder wall, performing deformation work with formation of longitudinal grooves; due to this work a high amount of energy is transformed and load peaks in the belt system are diminished.

The limitation of the load peaks occurring in the belt system which can be achieved with such an energy converter makes a substantial contribution to the reduction of the risk of injury, as can be proved with the aid of load measurements on so-called dummies. It has however been found that although the load peaks in the belt system can be limited by such an energy converter, they cannot be avoided.

SUMMARY OF THE INVENTION

The present invention provides an improved energy converter wherein only load peaks in the belt system are further reduced and almost eliminated, so that an almost constant load, or one which rises gradually in desired manner, occurs in the belt system.

According to the invention, the tubular body has a circular cross-sectional form in the undeformed state, although the rollers are cylindrical and initially engage the wall of the converter body only at the edges of their axial ends. The energy converter according to the invention is designed particularly for a force limitation to a level within a range of about 5,000 to 12,000 N. Forces in this range occur at the belt buckle; since at the buckle forces are introduced via two webbing portions, that is the shoulder belt and waist belt, the force level there is twice as high as, for example, in the webbing portion between the deflection fitting and belt retractor. The energy converter according to the present invention is therefore intended in particular for use in the region between the buckle and its anchoring to the vehicle.

The invention is based on the recognition that to avoid load peaks in the belt system it must be ensured that the energy transformation by plastic deformation of the material of the converter body takes place smoothly without jerks. To achieve this, it is favourable for the deformation members to penetrate into the material of the converter body appreciably deeper than the roller bodies of the known energy converter. This then avoids the wall of the converter body initially yielding elastically and then being approximately polygonally deformed before the deformation members penetrate into the material of the wall of the converter body. It has been found that abrupt fluctuations of the travel-dependent force profile can be substantially avoided if a predominantly plastic deformation of the wall of the tubular converter body occurs and elastic deformations are extensively suppressed.

Various further developments and embodiments are set forth in the subsidiary claims.

BRIEF DESCRIPTION OF THE DRAWING

Further features and advantages of the invention will be apparent from the following description of several embodiments and from the drawings, to which reference is made and in which.

DESCRIPTION OF THE PREFERRED EMBODIMENT

Figure 1:
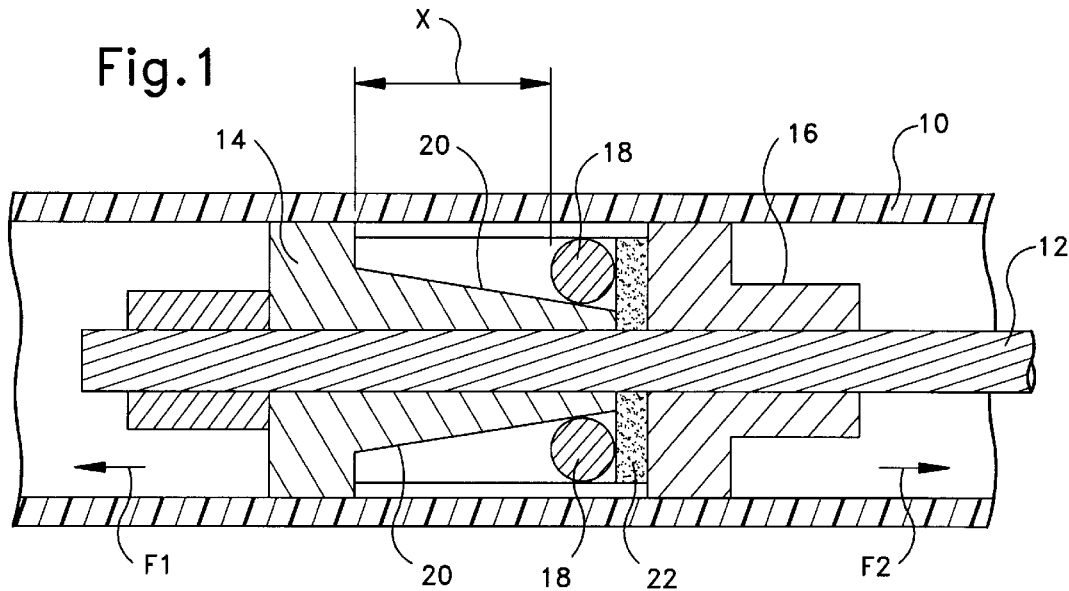
FIG. 1 shows a schematic partial longitudinal section of a first embodiment of an energy converter.

In a tubular converter body 10 of circular cross-section a deforming means is arranged on a pulling cable 12 and comprises two piston elements 14, 16 secured behind each other on the pulling cable 12 and two rollers 18 which bear on two symmetrically oppositely disposed ramp faces 20 of the piston member 14 and abut on a position at the bottom of the ramp faces 20 by a plate 22 of resilient material, coming into contact at their axial end faces with the inner side of the wall of the tubular converter body 10. The piston elements 14, 16 are displaceable in the tubular converter body 10.

Figure 2:
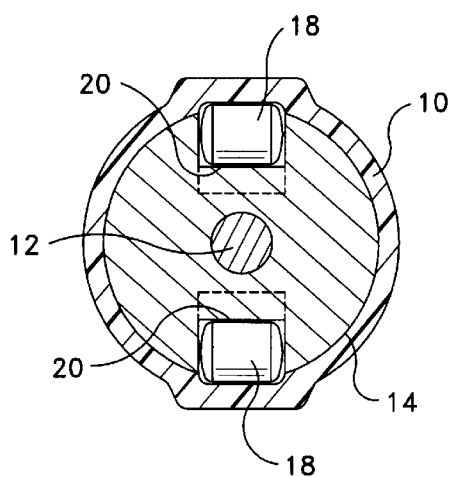
FIG. 2 shows a cross-section of the energy converter shown in FIG. 1 after plastic deformation of the tubular converter body has occurred.

In a safety belt system the tubular converter body 10 is anchored for example to the vehicle and the belt buckle is connected to the pulling cable 12. The piston/cylinder means shown in FIG. 1 may form at the same time the linear drive of a belt pretensioner engaging the buckle. In such a construction the piston element 16 is subjected in the cylinder formed by the tubular converter body 10 to the pressure of the gases generated by a pyrotechnical gas generator, so that the piston elements 14, 16 are displaced in FIG. 1 in the direction of an arrow F1 in the interior of the tubular converter body 10, the pulling cable 12 and consequently the buckle connected thereto being entrained. After belt tightening has been effected the forward displacement of the vehicle occupant secured by the belt system begins, a tension being exerted via the pulling cable 12 in the direction of the arrow F2 in FIG. 1 on the piston elements 14, 16. The rollers 18, which permit a free movement of the piston elements 14, 16 in the direction of the arrow F1 are held by the plate 22 resiliently in engagement with the inner side of the wall of the tubular converter body 10 and come into engagement with said wall when the movement in the direction of the arrow F2 takes place because they are pressed radially outwardly by the ramp faces 20. They now penetrate in a smoothly progressive manner into the material of the wall of the tubular converter body 10, leading to a plastic deformation of said wall during an energy dissipating stroke movement of the piston elements 14, 16. This state of a plastic deformation is illustrated in FIG. 2.

Figure 3A:
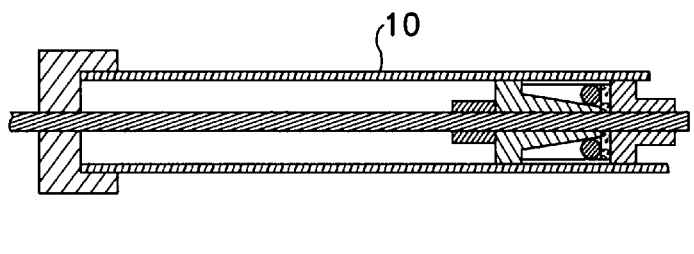
FIGS. 3a to 3c show three embodiments of the energy converter with different configurations of the tubular converter body.
Figure 4A:
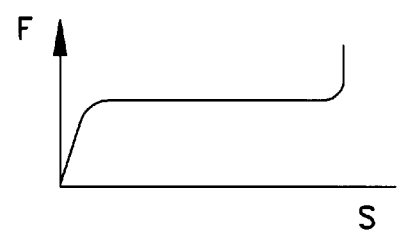
FIGS. 4a to 4c show diagrams which illustrate the profile of the force as a function of the travel for the embodiments according to FIGS. 3a and 3c.

If the wall thickness of the tubular converter body 10 is constant as illustrated in FIG. 3a, the profile of the force F shown in the diagram of FIG. 4a as a function of the travel S results. The force F is the force which must be exerted in the displacement of the piston elements 14, 16 with the plate 30 in the tubular converter body 10 and the travel distance S is that of the displacement of said piston elements 14, 16, with the plate 22 in the interior of the converter body 10. As apparent from FIG. 4a, the force F starts from zero and increases smoothly up to a maximum value which is reached after only a fraction of the total travel available. It should be particularly noted that the profile of the force F is largely free from peaks and troughs. It is here that the energy converter according to the invention differs very considerably from the prior art comprising a plurality of individual deformation members, for example balls, which penetrate only slightly into the material of the converter body. In the embodiment shown in FIG. 3a and having a constant wall thickness of the converter body 10, the force F thereafter remains almost constant until the end stop of the converter body 10 is reached.

Figure 3B:
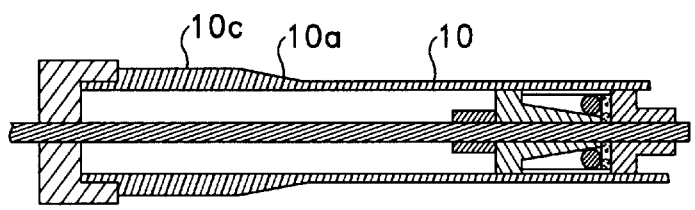
Figure 4B:
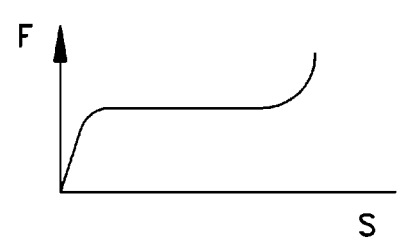

In the embodiment shown in FIG. 3b the wall thickness of the converter body 10 is constant over about half its length and then increases in a portion 10a gradually to about twice the value, thereafter remaining constant in a portion 10c. FIG. 4b shows the associated profile of the force F as a function of the travel S. In contrast to FIG. 4a, the force F increases after passing through about half the travel S and reaches its maximum value just before the end of the converter body.

Figure 3C:
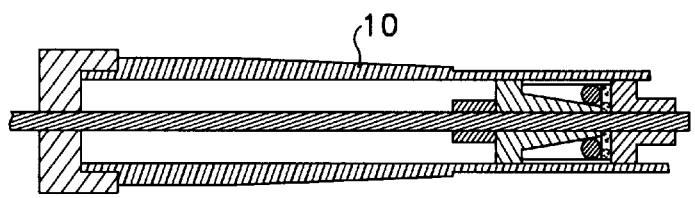
Figure 4C:
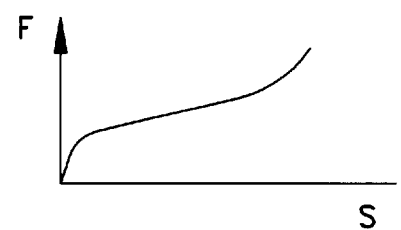

In the embodiment according to FIG. 3c the wall thickness of the converter body 10 increases gradually from the start thereof to the end thereof. FIG. 4c shows the associated profile of the force F as a function of the travel S. As can be seen, the force F increases initially relatively steeply and then progressively, gradually assuming a maximum value in the region of the stop at the end of the converter body 10.

By suitable dimensioning of the wall thickness of the converter body 10 over the length thereof, almost any desired profile, suitable for a specific use of the force F as a function of the travel S can be achieved. In all projections it can be seen that the force profile is completely free of pronounced peaks or troughs, thereby very considerably diminishing the risk of injury.

Figure 2A:
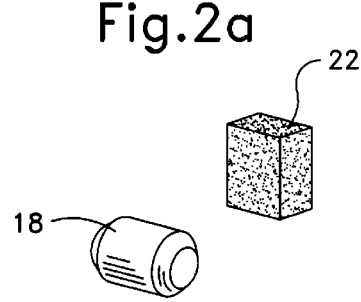
FIG. 2a shows a schematic perspective view of a plate in the embodiment of the energy converter shown in FIGS. 1 and 2.

FIG. 2a shows the plate 22 and a roller 18 which are both arranged on the ramp face 20. The ramp face 20 is formed at the bottom of a groove recessed in the piston element 14. By the side walls of the groove each roller 18 is held in a favourably centre rest position for the start of the deformation work. For to avoid load peaks it is important for the rollers 18 to be brought into engagement uniformly and gradually with the inner side of the tubular converter body 10.

A further optimizing is achieved in that the rollers 18 are provided at their axial end faces with a rounded transition to the outer surface. The radius of the rounded portion, depending on the material and size of the converter body 10, is about 0.7 to 0.9 mm preferably 0.8 mm. This rounding achieves that the rollers 18 with their ends initially come into gentle engagement with the inner side of the converter body 10 cutting or chip-removing manner.

I claim:

1. An energy converter in a restraining system for vehicle occupants, comprising:

a tubular converter body made of plastically deformable material, said converter body having a wall defining a cylindrical bore with a circular cross-section and a longitudinal axis;

a piston member slidably received within said converter body;

a cable connected to said piston member; and a pair of cylindrical rollers on diametrically opposed sides of said piston member, said piston member having surface means for defining a respective recess for each roller, said surface means including a ramp surface for each recess, each roller being located within said respective recess, each of said rollers having a longitudinal axis which extends perpendicular to the axis of said converter body, each of said rollers being supported on its side which is remote from said wall of said converter body by said respective ramp surface on said piston member, upon movement of said piston member in a first direction said rollers move from a rest position toward an engagement position and engage said wall of said converter body to plastically deform said wall for converting energy, each of said rollers have axial ends, each of said rollers have rounded peripheral edges on each axial end, a radius of curvature of said rounded edges is between about 0.5 to 1.0 mm.

2. An energy converter as set forth in claim 1, wherein said radius of curvature is between about 0.7 to 0.9 mm.

3. An energy converter for a vehicle occupant restraining system, said converter comprising:

a tubular converter body having a wall made of a plastically deformable material, said converter body having a longitudinally axis and a hollow cylindrical bore with a circular cross-section;

piston means for movement relative to said converter body, said piston means being coaxially located within said hollow cylindrical bore, said piston means being slidable within said hollow cylindrical bore relative to said converter body, cable means for transferring force between said piston means and the vehicle occupant restraining system, said cable means being connected to said piston means; and deformation means movable with said piston means for plastically deforming said converter body to a non-circular cross-section to convert energy during an energy dissipating stroke of said piston means and said deformation means along the axis of said converter body, said deformation means including first and second cylindrical rollers, said first roller being located at a first position adjacent to said piston means, said second roller being located at a second position adjacent to said piston means which is diametrically opposed to said first position, each of said first and second rollers having a longitudinal axis which is perpendicular to the axis of said converter body.

4. An energy converter as set forth in claim 3, wherein said piston means includes surfaces for defining first and second ramp surfaces, said first and second rollers being located adjacent to said first and second ramp surfaces, respectively, each roller being movable along said respective ramp surface in a first direction relative to said piston means to deform said converter body when said piston means moves within said converter body in a second direction relative to said converter body, said first direction being opposite to said second direction.

5. An energy converter in a restraining system for vehicle occupants, comprising:

a tubular converter body made of plastically deformable material, said converter body having a wall defining a cylindrical bore with a circular cross-section and a longitudinal axis;

a piston member slidably received within said converter body;

a cable connected to said piston member; and a pair of cylindrical rollers movable with said piston member on diametrically opposed sides of said piston member, said piston member having surface means for defining a respective recess for each roller, said surface means including a ramp surface for each recess, each roller being located within said respective recess, each roller having a longitudinal axis which extends perpendicular to the axis of said converter body, each roller being supported on its side which is remote from said wall of said converter body by said respective ramp surface on said piston member, upon movement of said piston member in a first direction along the axis of said converter body said rollers moving from a rest position toward an engagement position and engaging said wall of said converter body, said rollers plastically deforming said wall during an energy dissipating stroke of said piston member and said rollers in the first direction for converting energy.

6. An energy converter as set forth in claim 5 including a plate of resilient material located in each of said recesses, each roller contacts said plate of resilient material in said respective recess when said rollers are in the rest position, each roller has axial ends, said axial ends contact said wall of said converter body as said rollers move from the rest position toward the engagement position.

7. An energy converter as set forth in claim 5, wherein said converter body is a cylinder of a pyrotechnical piston/cylinder linear drive of a belt pretensioner, said piston member is a piston of said linear drive, said rollers are arranged on said piston of said linear drive, upon activation of said linear drive said piston moves in a second direction opposite to said first direction.

8. An energy converter as set forth in claim 5, wherein said converter body has opposed axial ends, said wall of said converter body has a variable thickness between said opposed axial ends for providing variable resistance to plastic deformation during the energy dissipating stroke of said piston member and said rollers.

9. An energy converter as set forth in claim 5, wherein said energy converter is dimensioned for forces occurring upon displacement of said rollers in said converter body in a range from about 5,000 N to about 12,000 N.

\* \* \* \* \*